United States Patent
Harui

(12) 
(10) Patent No.: US 6,690,394 B1
(45) Date of Patent: Feb. 10, 2004

(54) METHOD AND APPARATUS FOR DELIVERING WEB DATA TO A WIRELESS DEVICE

(76) Inventor: Alex J. Harui, 1048 Galley La., Foster City, CA (US) 94404

( * ) Notice: Subject to any disclaimer, the term of this patent is extended or adjusted under 35 U.S.C. 154(b) by 358 days.

(21) Appl. No.: 09/696,598

(22) Filed: Oct. 24, 2000

(51) Int. Cl.[7] ............................................. G06F 3/00
(52) U.S. Cl. ................................... 345/762; 345/854
(58) Field of Search ............................... 345/762, 765, 345/744, 781, 853, 854; 217/1, 101, 120

(56) References Cited

U.S. PATENT DOCUMENTS 5,945,989 A * 8/1999 Freishtat et al. ............. 345/762
6,469,714 B2 * 10/2002 Buxton et al. .............. 345/744

* cited by examiner

*Primary Examiner*—Cao (Kevin) Nguyen
(74) *Attorney, Agent, or Firm*—Dinh & Associates

(57) ABSTRACT

A feature in a web browser allows a user to specify all or a portion of a web page and to schedule and/or how often to send the current contents of that portion of the web page to a receiving device such as a alpha-numeric pager or cellular telephone, thereby reducing or eliminating the need for having a browser on the device.

32 Claims, 6 Drawing Sheets

METHOD AND APPARATUS FOR DELIVERING WEB DATA TO A WIRELESS DEVICE

BACKGROUND OF THE INVENTION

The present invention relates to the World Wide Web, and more particularly to novel and improved techniques that allow for access to the World Wide Web from wireless devices such as cellular telephones.

The World Wide Web, commonly known as the Internet, has made it possible for users to access data stored all over the world from their computers. However, these computers generally are wired to the Internet. With the growth and popularity of wireless communication, there is much interest in providing access to information on the World Wide Web from wireless devices such as cellular telephones.

A predominant direction of the telecommunication industry is to build Web browsers into wireless devices. Users are encouraged to buy these new devices for web access even though their current devices are usually otherwise quite suitable for their communication needs. The new devices are typically more expensive, and some models are larger and therefore more cumbersome to carry around.

The use of Web browsers on wireless devices can be problematic for a number of reasons. First, text entry by the user is typically arduous since these small devices generally do not have full keyboards and, instead, have small buttons. Second, the small screens of these devices also make it difficult to view information on web pages, especially pages containing ancillary information such as advertisements and banners. And third, navigating the Web using wireless devices is also time consuming and costly. Wireless connection for these devices is generally expensive, especially if the user is outside of his or her local calling area. The wireless connection is also typically slow compared to wired connections. These significant trade-offs and limitations are typically imposed on users desiring access to the Web from wireless devices.

Thus, techniques that allow users to access information from the World Wide Web from wireless devices with reduced efforts are highly desirable, especially in today's mobile environment.

SUMMARY OF THE INVENTION

The invention addresses the shortcomings described above by allowing a user to use existing wireless devices to access information on the World Wide Web. In one aspect, text is extracted from a selected region of a selected web page and sent to a wireless device. This allows the user to skip over advertisements and other ancillary information and choose just enough information to fit in the small screens of many wireless devices. Moreover, most of these wireless devices can receive a selected text very quickly, so the user does not have to wait as long for the information and connection time is also shortened.

In an embodiment, information is transmitted to the wireless device based on a particular schedule, which can be defined by the user. The information can then be stored in the wireless device and becomes available whenever the user desires to view it. In this manner, the user does not need to use a keyboard on the device to obtain the information. Furthermore, the user does not need to expend the time and effort to set up an Internet connection and navigate to the selected web page each time the user desires information.

An embodiment of the invention provides a method for delivering information to a receiving device (e.g., an alphanumeric pager or cellular telephone). In accordance with the method, information is received indicating a particular portion of a particular source (e.g., a web page) from which to retrieve selected information. A selected schedule is also received for delivering the selected information to the receiving device. At a scheduled time, information from the particular portion of the particular source is retrieved, extracted, and delivered to the receiving device. In this manner, the receiving device is able to receive updates of the contents of the selected information without the need for a Web browser and without the overhead associated with setting up a Web connection.

The foregoing, together with other aspects of this invention, will become more apparent when referring to the following specification, claims, and accompanying drawings.

DESCRIPTION OF THE SPECIFIC EMBODIMENTS

Figure 1:
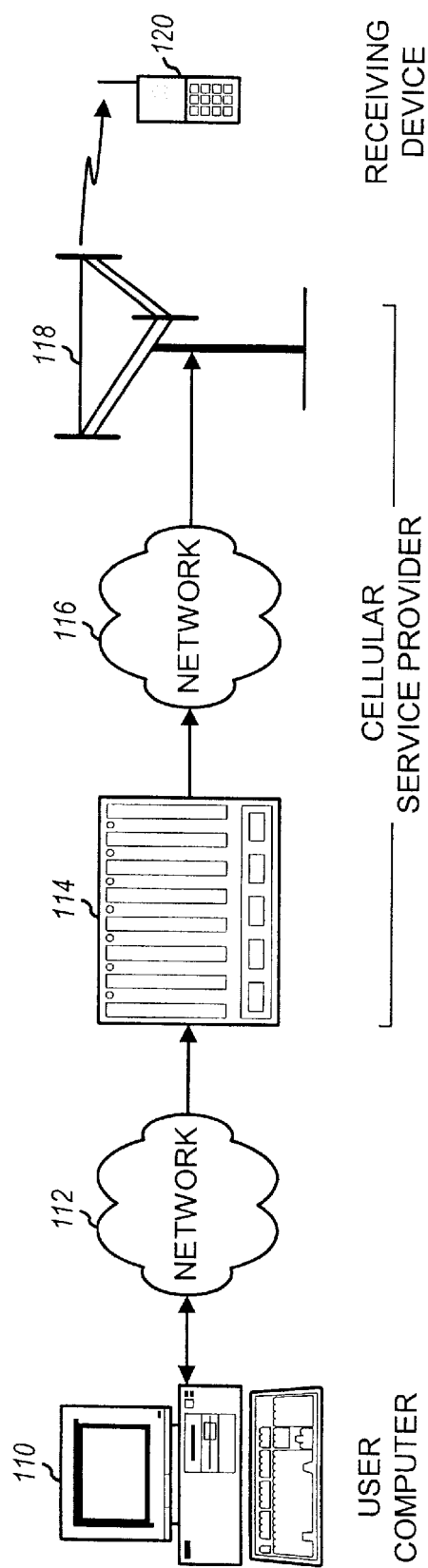
FIG. 1 is a block diagram of a system capable of delivering (Web) data to a receiving (wireless) device in accordance with an aspect of the invention.

FIG. 1 is a block diagram of a system capable of delivering (Web) data to a receiving (wireless) device in accordance with an aspect of the invention. Via a user computer 110, a user is able to select a particular information and a particular schedule to transmit the selected information to a receiving device 120. The selected information is typically from a web page accessed via a computer network 112, but can also be from a file located in user computer 110 or some other source. Network 112 may be the World Wide Web (i.e., the Internet).

The scheduled data services described herein may be implemented in part on the user computer. The scheduled data services may also be instituted as a new service that may be supported by a cellular service provider or some other entity. This new service can be provided in addition to other telephony and data services normally provided by the cellular service provider.

In an embodiment, the user may be provided with the flexibility to select the particular services (i.e., the particular information) and the particular schedule for receiving the data at receiving device 120. In this embodiment, the user is able to access a favorite web site that may provide better information. Alternatively, the user may be provided with pre-defined sets of information services from which the user can select.

For a particular service selected by the user, at a scheduled time, the selected information is captured from the selected source (e.g., the selected web page), extracted, and sent (e.g., as an e-mail, or via some other protocol) via network 112 to a data server 114 of a cellular service provider. Data server 114 processes and forwards the information via a network 116 to a transmitting base station 118, which then transmits the information to receiving device 120.

Figure 2:
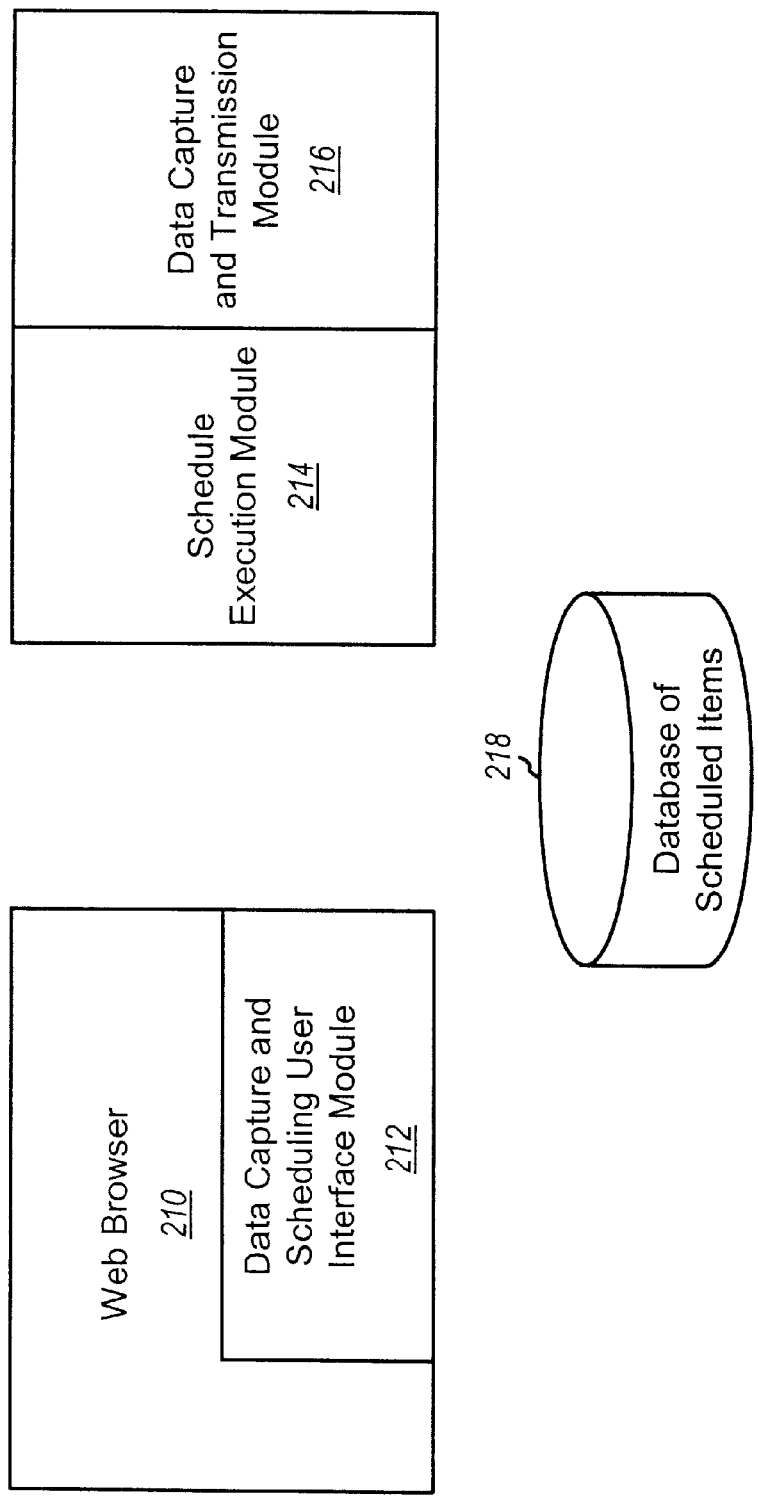
FIG. 2 is a block diagram of an architecture that supports the delivery of data in accordance with an aspect of the invention.

FIG. 2 is a block diagram of an architecture 200 that supports the delivery of Web data in accordance with an aspect of the invention. Architecture 200 includes a data capture and scheduling user interface (UI) module 212, a schedule execution module 214, a data capture and transmission module 216, and a database 218 operating in conjunction with a Web browser 210.

Web browser 210 allows the user to navigate through the World Wide Web and access information located throughout the world. The information is typically presented in a web page that is uniquely identified by an address called a Uniform Resource Locator (URL). Data capture and scheduling user interface (UI) module 212 allows the user to select a particular region of a selected web page (e.g., the currently viewed web page) and to review the information from the selected region (e.g., in a format similar to that to be displayed on the receiving device) and schedules the transmission of the selected information. Schedule execution module 214 monitors the schedules submitted by the user, determines when a transmission is needed, and dispatches data capture and transmission module 216 to process the transmission. Data capture and transmission module 216 captures the selected information from the selected source and sends the information to the receiving device (or more specifically, to the next network entity responsible for sending the information to the receiving device).

In one embodiment, data capture and scheduling user interface module 212 resides within user computer 110 in FIG. 1, and schedule execution module 214, data capture and transmission module 216, and database 218 reside within data server 114 of the cellular service provider. The user selects the particular information to be delivered at scheduled times, and thereafter the equipment (e.g., a data server) of cellular service provider maintains the delivery of the selected information. In an alternative embodiment, modules 212, 214, and 216 and database 218 reside within user computer 110. In this embodiment, user computer 110 signals to the cellular service provider when a transmission of a selected information is required and also provides the data to be delivered. Other configurations are also possible and within the scope of the invention.

Figure 3:
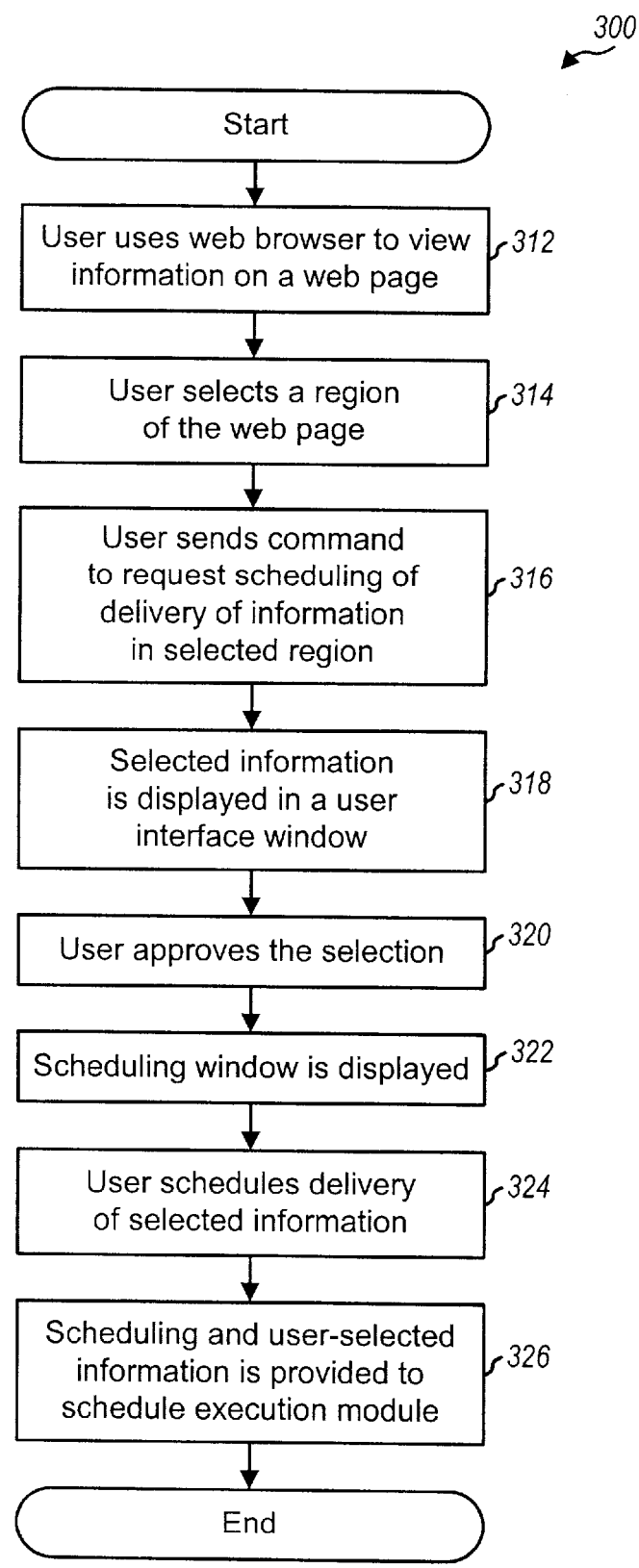
FIG. 3 is a flow diagram of a process for selecting data and scheduling the transmission of information in accordance with an embodiment of the invention.

FIG. 3 is a flow diagram of a process 300 for selecting data and scheduling the transmission of information in accordance with an embodiment of the invention. For clarity, process 300 is specifically described for an implementation using architecture 200 in FIG. 2. Initially, a user employs a Web browser 210 to view information, at step 312. This information typically resides on a page on the World Wide Web. However, many browsers also support viewing of documents accessed via the user computer's file system. Various types of information from various sources may be viewed and are within the scope of the invention. For clarity, the following description is for information residing on a web page.

The user then selects a region (or portion) of the web page, at step 314. If no selection is made, the entire page may be assumed to be selected. The user then selects a command (e.g., provided on the Web browser) to request scheduling of the transmission of the selected information, at step 316. In response, a user interface window displays the data extracted from the selected region of the web page, at step 318, so that the user can confirm that the desired information has been properly selected. The user interface window may be designed to mimic a display on a destination (or default) wireless device so that the user is provided with an indication of how the data may actually look on the device. Based on the display on the user interface window, the extracted data may be reformatted by the user for improved readability on the destination device.

The user then approves of the data on the user interface window, at step 320. Next, a scheduling window is presented to allow the user to schedule transmission of the selected information, at step 322. Via the scheduling window, the user can specify when and/or how often to send the data to the destination device, at step 324. The scheduling window may also allow the user to select an alternate or multiple destination devices. Once the user approves of the schedule, information describing the user-selected schedule and user-selected data is provided to schedule execution module 214 via the database 218, at step 326. Information describing the user-selected data may include, for example, a URL or file path of the selected web page, a description of the selected region of the web page, and possibly other information.

Figure 4:
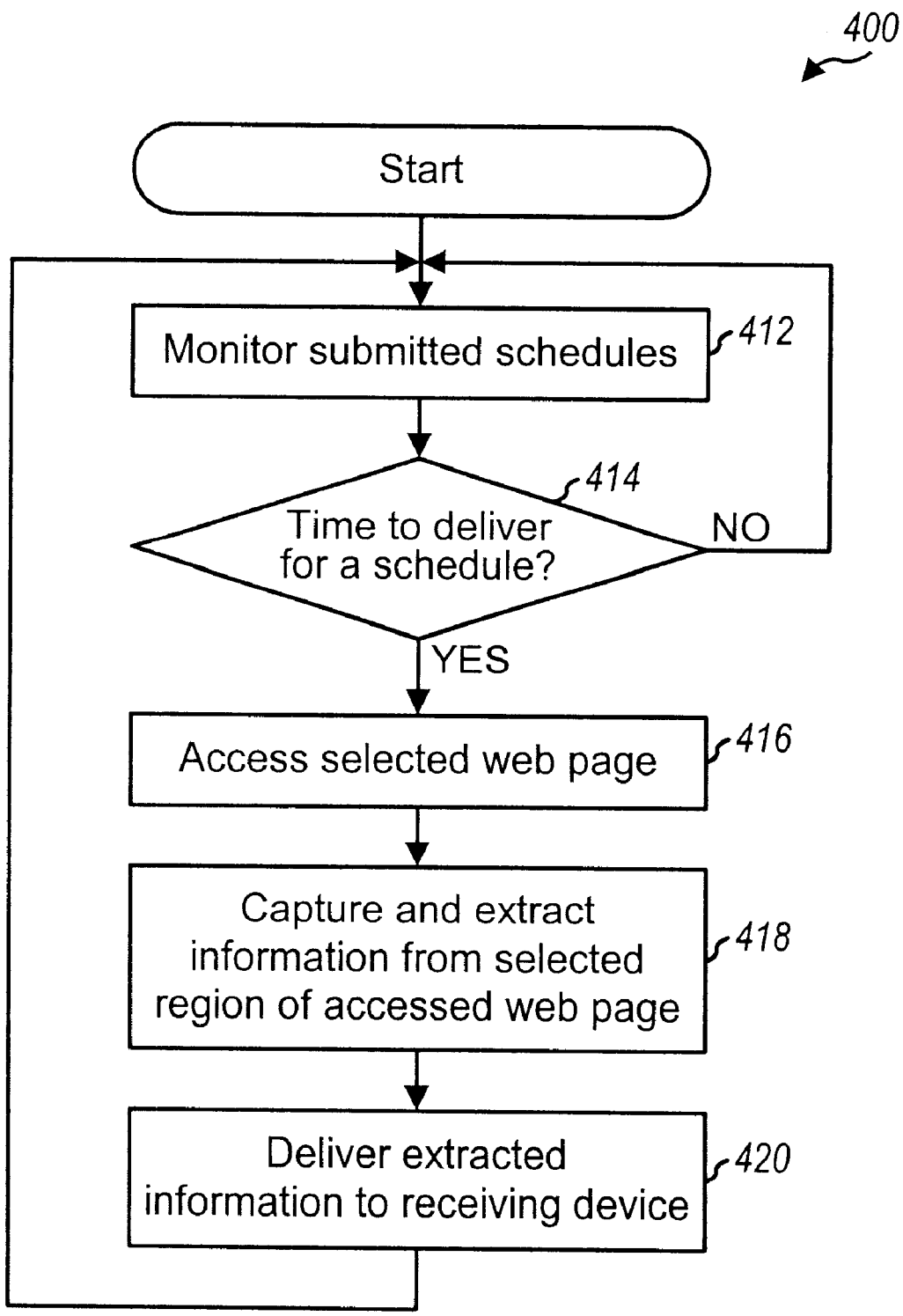
FIG. 4 is a flow diagram of a process for monitoring schedules and transmitting information defined by the schedules at their scheduled times, in accordance with an embodiment of the invention.

FIG. 4 is a flow diagram of a process 400 for monitoring schedules and transmitting information defined by the schedules at their scheduled times, in accordance with an embodiment of the invention. For clarity, process 400 is also specifically described for an implementation using architecture 200 in FIG. 2.

At step 412, schedule execution module 214 monitors the submitted schedules. A determination is periodically made (e.g., at each timer update event), whether a schedule is ready for transmission, at step 414. If no schedules are imminent, the process returns to step 412 and schedule execution module 214 continues to monitor the submitted schedules.

Otherwise, if it is determined that a schedule is ready for transmission (i.e., the selected region of a particular web page should be sent to a particular destination device), schedule execution module 214 passes control to data capture and transmission module 216. Data capture and transmission module 216 accesses the selected web page using the description of the selected region retrieved from database 218, at step 416. Data capture and transmission module 216 then captures and extracts the data from the selected region of the accessed web page, at step 418. In this manner, changes to the content of the selected region will be captured and transmitted to the destination device. This enables the user to receive periodic updates of information from the selected region of the selected web page.

Once the data is extracted, transmission module 216 dispatches the data to the destination device, at step 420. Transmission module 216 can use e-mail, WAP (Wireless Application Protocol), SMS (Short Message Service), SMTP (Simple Mail Transfer Protocol), and/or any other public or proprietary protocol or API (Application Programming Interface) to transmit the data. The destination device is typically a wireless device such as an alpha-numeric pager or cellular phone, but may also be a wireline device (i.e., the destination device does not need to be wireless or mobile).

For a better understanding, certain aspects of the invention are now described for a specific implementation using Internet Explorer from Microsoft Corporation as the Web browser.

Figure 5:
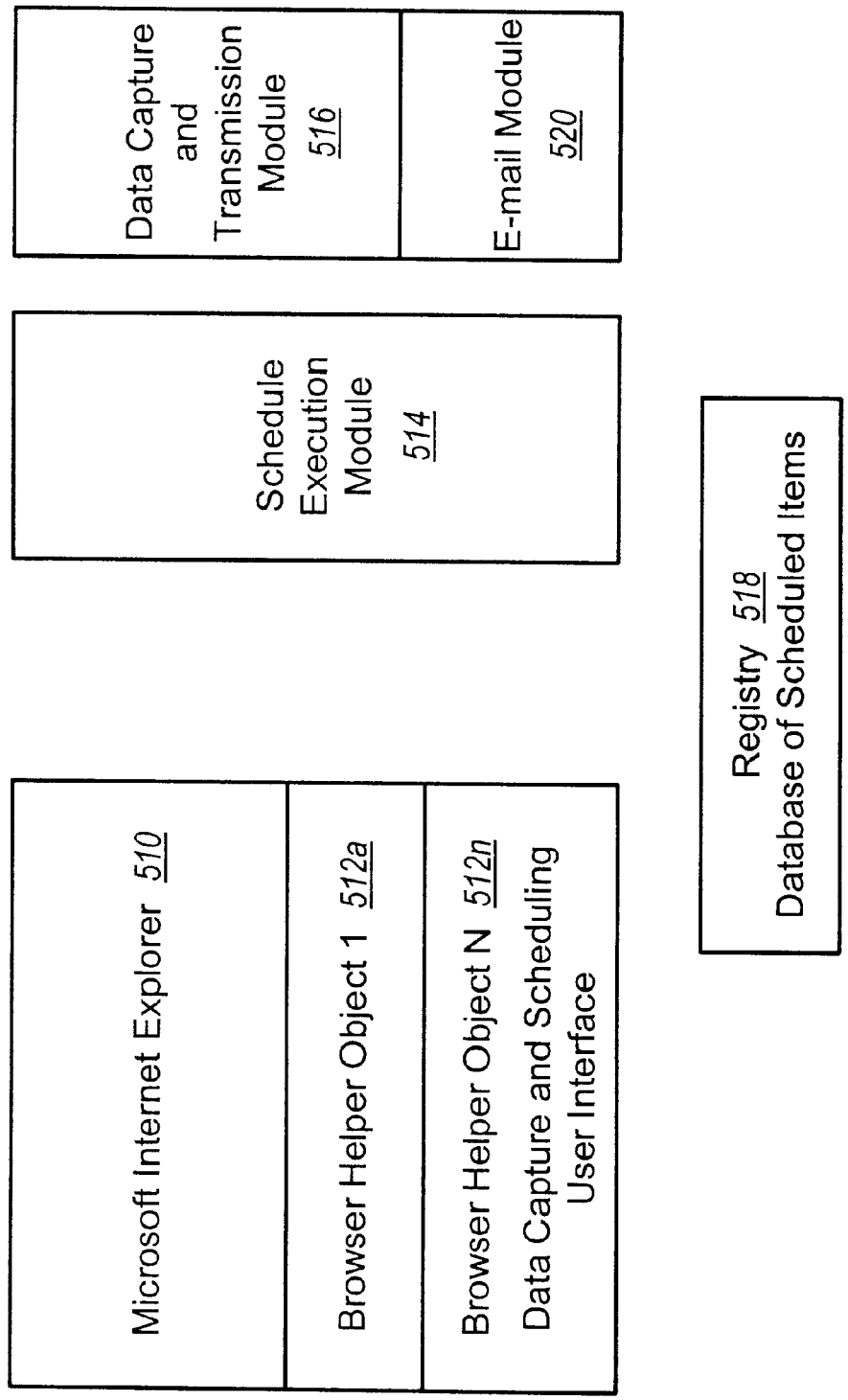
FIG. 5 is a block diagram of an architecture that supports the delivery of Web data in accordance with an aspect of the invention.

FIG. 5 is a block diagram of an architecture 500 that supports the delivery of Web data in accordance with an aspect of the invention. Architecture 500 includes a Web browser 510 (implemented with Internet Explorer from Microsoft Corporation).

Architecture 500 further includes a schedule execution module 514, a data capture and transmission module 516, and a registry 518 that operate in similar manners as schedule execution module 214, data capture and transmission module 216, and database 218 in FIG. 2, respectively. In certain embodiments of the invention, an email module 520 may also be provided in architecture 500 to send Web data via a particular protocol.

Internet Explorer allows third parties to create a module commonly known as a Browser Helper Object 512. This module is loaded when Internet Explorer is started and has access to some of the Internet Explorer user interfaces and functionalities. When a Browser Helper Object 512 is loaded by Internet Explorer, the module "subclasses" the main window and can be implemented to add a new menu item to the Tools menu on Internet Explorer. This new menu item may be called "PushPage".

In an embodiment, the data capture and scheduling user interface module is implemented as a Browser Helper Object 512n, and a menu item is provided in the Tools menu for Object 512n. The user can view a particular web page and use a mouse to select a portion of the currently viewed web page. The user can then select the added menu item from the Tools menu. Using Microsoft's IHTML family of interfaces (OLE/COM Interfaces), the selected region is accessed and extracted. A specific embodiment of the text extraction is now described.

In an embodiment, the text extraction method takes the parent element of the selected region and then accesses the children of the parent element to determine if each child is contained in the selected region. A list of the children is kept, along with information indicating whether the children are contained, not contained, or partially contained in the selected region. If a child is partially contained in the selected region, its children are examined. The process continues until the child has no children, in which case a character offset into the selected region is stored. The child is then represented as a list of whether its children are contained, not contained, or partially contained in the selected region. This potentially creates a hierarchy of lists.

Next, the parent of the parent element is examined. A list is constructed as to whether the children of that parent contain the parent element of the selected region or not. Then that parent's parent is examined and a list is built at that level. This continues until the top level is reached. In this way, the hierarchy of a document can be examined to find the selected region again, even if other regions of the document may have changed.

The list of contained regions is then used to extract the text from the selected region. Special handling can be used for table elements in order to enhance readability. For each contained element, it is examined to see if it is a table element or contains table elements. If it is a table element, the text is extracted and padded with spaces. If it contains a table element, its children are accessed individually. If the child is a table element, its text is extracted and padded with spaces. If the child contains table elements, its children in turn are examined. And if none of the above applies, the text is extracted. The text from each extracted element is then concatenated to form the extracted text for the selection. This text is displayed on an interface window (e.g., a pop-up dialog box) for the user.

Once the selected text is approved by the user, the scheduling interface is displayed, e.g., on another pop-up dialog box. In an embodiment, the user is allowed to choose from a number of scheduling options such as:

Every nn Minutes

Every nn Hours

Every nn Days at hh:mm

Every nn Weeks at hh:mm

On the nn$^{th}$ Day of the Month at hh:mm

On the 1$^{st}$ SMTWTFS of the Month

On the 2$^{nd}$ SMTWTFS of the Month

On the 3$^{rd}$ SMTWTFS of the Month

On the 4$^{th}$ SMTWTFS of the Month

On the 5$^{th}$ SMTWTFS of the Month

On the Last SMTWTFS of the Month

On the Last Day of the Month

In additional options, the user may specify (1) that the schedule is only valid between a start and end date, (2) which days of the week the schedule should be ignored, (3) the months of the year in which the schedule should be ignored, and so on. Other scheduling options can also be provided and are within the scope of the invention.

Once the user approves the schedule, the scheduling information and the hierarchy list is then stored in registry 518 and schedule execution module 514 is notified.

In an embodiment, schedule execution module 514 is a separate executable that is installed in the user's start-up folder and is represented by an icon on a taskbar displayed in the user's computer desktop. The user can select this icon to change the configuration information such as, for example, the address of the destination device, the protocol used to transmit the data, and so on. The user can also activate this icon to view and edit the schedule of pages. In alternative embodiments, schedule execution module 514 can be executed on another computer separate from the one executing Web browser 510.

In an embodiment, schedule execution module 514 employs a timer that updates at a particular rate (e.g., every minute). At each timer update event, schedule execution module 514 checks the schedules to determine whether a particular transmission of information needs to be initiated (i.e., if a page needs to be sent). If so, schedule execution module 514 launches a separate data transmission module 516. Schedule execution module 514 keeps track if a timer event comes in during the time when data transmission module 516 is busy so that scheduled events are not missed. Once the transmission is complete, the schedules are checked again for that time in case other pages need to be sent around that time.

Schedule execution module 514 is also responsible for setting up the connection to the Internet for systems using dial-up access. Schedule execution module 514 keeps track of upcoming events and does not disconnect if another event is to follow soon after the current event.

Data capture and transmission module 516 can be implemented as a separate executable. Data capture and transmission module 516 can employ the same text extraction method described above for Browser Helper Object 512n. In a specific embodiment, data capture and transmission module 516 takes the extracted text and sends it via e-mail using e-mail module 520. The e-mail can be sent via SMTP, Microsoft's Messaging API (MAPI), or some other protocol. In this embodiment, the user's receiving device is capable of receiving e-mails. Alternatively, the data is represented as plain text and transmitted to a text-capable receiving device.

Other techniques to send the selected information can also be used and are within the scope of the invention.

Figure 6:
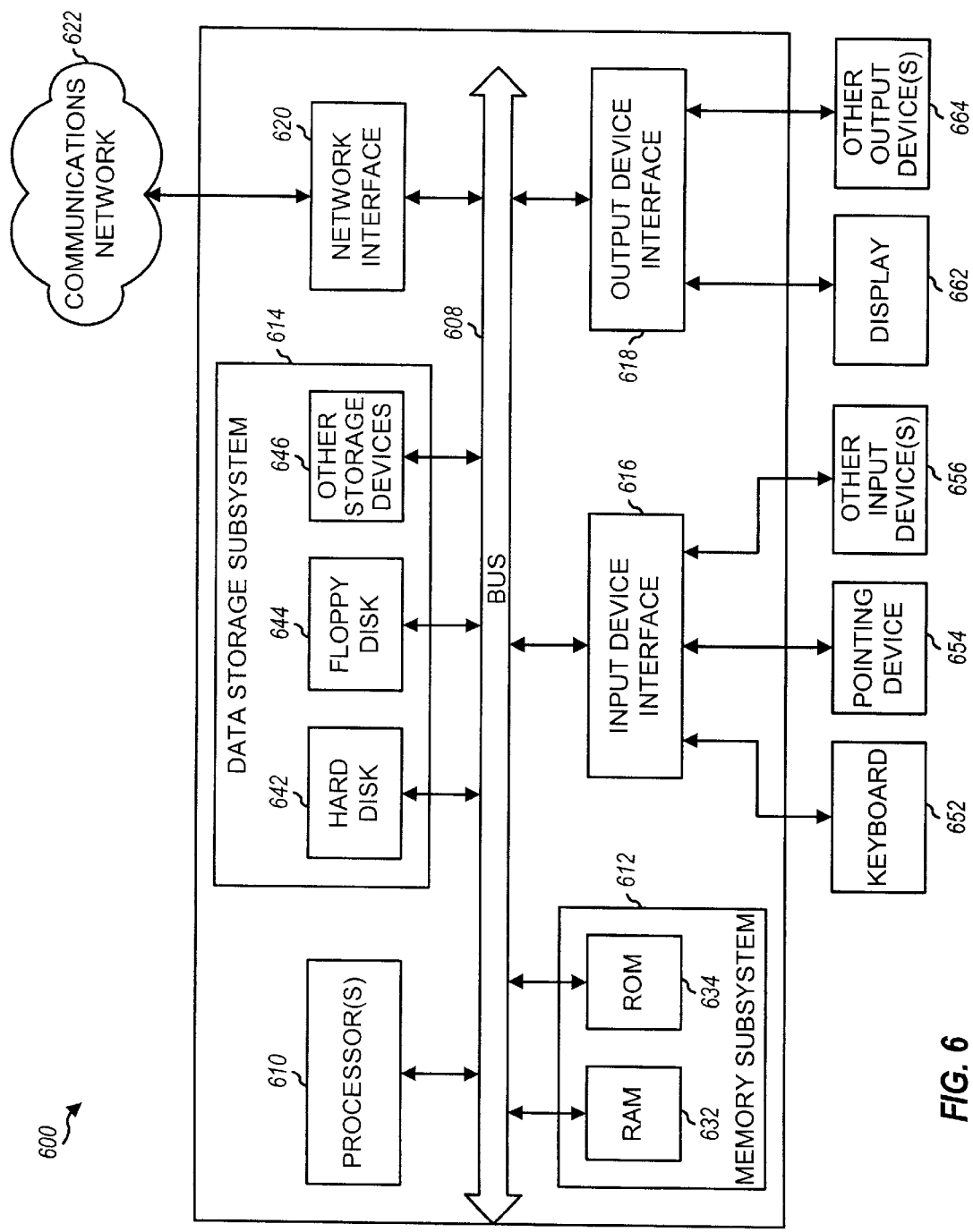
FIG. 6 is a block diagram of an embodiment of a computer system that can be used to implement the user computer in FIG. 1 and support at least a portion of the architectures shown in FIGS. 2 and 5.

FIG. 6 is a block diagram of an embodiment of a computer system 600 that can be used to implement user computer 110 in FIG. 1 and support at least a portion of architectures 200 and 500 shown in FIGS. 2 and 5. As shown in FIG. 6, computer system 600 includes a bus 608 that interconnects major subsystems such as one or more processors 610, a memory subsystem 612, a data storage subsystem 614, an input device interface 616, an output device interface 618, and a network interface 620.

Bus 608 provides a mechanism for allowing various components and subsystems of computer system 600 to communicate with each other. Many of the subsystems and components of computer system 600 need not be at the same physical location but may be distributed at various locations throughout the communications network. Although bus 608 is shown in FIG. 6 as a single bus, alternate embodiments of bus 608 may utilize multiple busses.

Processor(s) 610 perform many of the processing functions for computer system 600 and communicate with a number of peripheral devices via bus 608. Memory subsystem 612 and data storage subsystem 614 store the programming and data constructs that provide the functionality of computer system 600. For example, the schedules and modules implementing the functionality of the invention may be stored in data storage subsystem 614. These schedules and modules are then provided to memory subsystem 612 and the modules are executed by processor(s) 610. In a distributed environment, the modules may be stored on a number of computer systems and executed by the processors of these computer systems.

Memory subsystem 612 typically includes a number of memories including a random access memory (RAM) 632 and a read only memory (ROM) 634. RAM 632 is typically used to store instructions and data during program execution and ROM 634 is typically used to store fixed instructions and data.

Data storage subsystem 614 provides persistent (nonvolatile) storage for schedules and modules, and may include a hard disk drive 642, a floppy disk drive 644, and other storage devices 646 such as a compact digital read only memory (CD-ROM) drive, an optical drive, and removable media cartridges. Each of the storage devices may be associated with removable media (e.g., floppy disks, CD-ROMs, and so on). One or more of the storage devices may be located at remote locations and coupled to computer system 600 via communications network 622.

Input device interface 616 provides interface with various input devices such as a keyboard 652, a pointing device 654 (e.g., a mouse, a trackball, a touch pad, a graphics tablet, a scanner, or a touch screen incorporated into a display), and other input device(s) 656. In general, the term "input device" is intended to include all possible types of devices and ways to input information into computer system 600. Via the input devices, the user is able to browse the Web, select a particular web page, select a particular region of the selected web page, schedule the transmission of information, and perform other functions.

Output device interface 618 provides an interface with various output devices such as a display 662 and other output device(s) 664. Display 662 may be a cathode ray tube (CRT), a flat-panel device such as a liquid crystal display (LCD), a projection device, and other visual devices. In general, the term "output device" is intended to include all possible types of devices and ways to output information from computer system 600 to a human or to another machine or computer systems. Via the output devices, the user is shown the selected information, possible scheduling options, and other information.

Network interface 620 provides an interface with outside networks including communications network 622. Through network interface 620, computer system 600 is able to communicate with other computer systems coupled to communications network 622, which may be coupled to the cellular service providers. Network interface 620 can provide a wireline or wireless interface to communications network 622.

Many other devices or subsystems (not shown) can be coupled to computer system 600. In addition, it is not necessary for all of the devices shown in FIG. 6 to be present to practice the invention. Furthermore, the devices and subsystems may be interconnected in configurations different from that shown in FIG. 6. The operation of a computer system such as that shown in FIG. 6 is readily known in the art and not described in detail herein. The source code to implement some embodiments of the invention may be operatively disposed in memory subsystem 612 or stored on storage media such as a hard disk, a floppy disk, or a CD-ROM that is operative with a CD-ROM player.

The foregoing description of the specific embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein, and as defined by the following claims.

What is claimed is:

1. A method for sending information to a wireless device, comprising:

receiving user selection for a portion of a web page, wherein the web page includes data and code for displaying the data;

generating a description for the user-selected portion of the web page;

retrieving contents from the user-selected portion of the web page based on the generated description; and sending the retrieved contents to the wireless device, wherein the retrieving and sending are performed based on a schedule.

2. The method of claim 1, wherein the schedule is user-selected.

3. The method of claim 1, further comprising:

storing the schedule and the description for the user-selected portion of the web page in a database.

4. The method of claim 1, wherein the user selection is for a source other than a web page from the World Wide Web.

5. The method of claim 1, further comprising:

interpreting the schedule; and at times specified by the schedule, accessing the web page to retrieve the contents.

6. The method of claim 5, further comprising:

setting up a dial-up connection to the Internet prior to accessing the web page; and disconnecting the connection after sending the retrieved contents to the wireless device.

7. The method of claim 6, further comprising:

examining the schedule; and if another web page is to be accessed within a particular amount of time, delaying the disconnecting in order to gain efficiency.

8. The method of claim 1, further comprising:

reformatting the retrieved contents prior to the sending in order to improve readability on the wireless device.

9. A method for scheduling delivery of information to a wireless device, comprising: receiving user selection for a portion of a web page from which user-selected information is to be retrieved and delivered to the-wireless device; generating a description for the user-selected portion of the web page; receiving a user-selected schedule for delivering the user-selected information to the wireless device; and storing the description for the user-selected portion of the web page and the user-selected schedule such that, at times indicated by the user-selected schedule, the user-selected information is retrieved from the user-selected portion of the web page and delivered to the wireless device.

10. The method of claim 9, wherein the user-selected schedule defines one or more specific times when the user-selected information is to be retrieved from the user-selected portion of the web page and delivered to the wireless device.

11. The method of claim 9, wherein the web page is from the World Wide Web.

12. The method of claim 9, wherein the web page is from a source other than the World Wide Web.

13. The method of claim 9, further comprising:

displaying the user-selected information in a particular format; and receiving an indication of user acceptance of the displayed information.

14. The method of claim 13, wherein the particular format resembles a format used to display the user-selected information on the wireless device.

15. The method of claim 13, further comprising:

receiving a directive to modify the format of the displayed information; and modifying the format of the displayed information in accordance with the received directive.

16. The method of claim 9, further comprising:

providing a display for options available for scheduling the delivery of the user-selected information.

17. The method of claim 16, further comprising:

receiving user selection for one or more designated times when the user-selected information is to be retrieved and delivered to the wireless device.

18. The method of claim 16, further comprising:

receiving user selection for one or more exclusionary time periods during which the user-selected information is not to be delivered to the wireless device.

19. A method for delivering information to a wireless device, comprising: receiving a description of a user-selected portion of a web page portion from which to retrieve user-selected information, wherein the description is generated based on user selection for the portion of the web page; receiving a user-selected schedule for delivering the user-selected information to the wireless device; and at a scheduled time indicated by the user-selected schedule, retrieving the user-selected information from the user-selected portion of the web page and the delivering of the retrieved information to the wireless device.

20. The method of claim 19, further comprising: monitoring the user-selected schedule; and initiating the retrieving of the user-selected information from the user-selected portion of the web page and the delivering of the retrieved information to the wireless device.

21. The method of claim 19, wherein the delivering is achieved via an e-mail.

22. The method of claim 19, further comprising:

reformatting the retrieved information for improved readability on the wireless device.

23. The method of claim 19, further comprising: storing in a database the description of the user-selected portion of the web page and the user-selected schedule.

24. The method of claim 19, wherein the web page is from a source other than the World Wide Web.

25. The method of claim 19, wherein the web page is from the World Wide Web.

26. The method of claim 25, further comprising:

setting up a connection to the Internet prior to accessing the web page; and disconnecting the connection after delivering the retrieved information to the wireless device.

27. The method of claim 26, further comprising:

monitoring the user-selected schedule; and if another web page is to be accessed and delivered within a particular time period, delaying the disconnecting such that the other web page can be processed without additional delays associated with setting up a connection.

28. The method of claim 19, wherein the wireless device is capable of displaying at least text.

29. The method of claim 19, wherein the wireless device is an alphanumeric pager.

30. A computer program product for delivering information to a wireless device, comprising:

code that directs reception of a description of a user-selected portion of a web page from which to retrieve user-selected information, wherein the description is generated based on user selection for the portion of the web page; code that directs reception of a user-selected schedule for delivering the user-selected information to the wireless device; code that, at times indicated by the user-selected schedule, directs retrieval of the user-selected information from the user-selected portion of the web page, and directs delivery of the retrieved information to the wireless device; and a data storage medium operative to store the codes.

31. An apparatus operable to send information to a wireless device, comprising: means for receiving user selection for a portion of a web page, wherein the web page includes data and code for displaying the data; means for generating a description for the user-selected portion of the web page; means for retrieving contents from the user-selected portion of the web page based on the generated description: and means for sending the retrieved contents to the wireless device, wherein the retrieving and sending are performed based on a schedule.

32. An apparatus operable to deliver information to a wireless device, comprising: means for receiving a description of a user-selected portion of a web page from which to retrieve user-selected information, wherein the description is generated based on user selection for the portion of the web page; means for receiving a user-selected schedule for delivering the user-selected information to the wireless device; means for retrieving the user-selected information from the user-selected portion of the web page at a scheduled time indicated by the user-selected schedule; and means for delivering the retrieved information to the wireless device.

* * * * *